United States Patent
Smith et al.

(10) Patent No.: US 11,518,353 B2
(45) Date of Patent: Dec. 6, 2022

(54) SYSTEMS AND METHOD FOR DETERMINING RUNNING CLEARANCE BRAKE COMMAND FOR A BRAKE SYSTEM

(71) Applicant: The Boeing Company, Chicago, IL (US)

(72) Inventors: Steven E. Smith, Chicago, IL (US); David T. Yamamoto, Chicago, IL (US); Nima Forghani, Chicago, IL (US)

(73) Assignee: The Boeing Company, Chicago, IL (US)

( * ) Notice: Subject to any disclaimer, the term of this patent is extended or adjusted under 35 U.S.C. 154(b) by 237 days.

(21) Appl. No.: 16/903,489

(22) Filed: Jun. 17, 2020

(65) Prior Publication Data

US 2021/0394725 A1 Dec. 23, 2021

(51) Int. Cl.
| | |
|---|---|
| B60T 8/00 | (2006.01) |
| B60T 8/17 | (2006.01) |
| B60T 8/171 | (2006.01) |
| B64C 25/46 | (2006.01) |
| B64C 25/42 | (2006.01) |
| F16D 66/00 | (2006.01) |

(52) U.S. Cl.
CPC ............ *B60T 8/1703* (2013.01); *B60T 8/171* (2013.01); *B64C 25/426* (2013.01); *B64C 25/46* (2013.01); *F16D 2066/003* (2013.01); *F16D 2066/005* (2013.01)

(58) Field of Classification Search
CPC .......... B60T 8/1703; B60T 8/171; B60T 8/00; B64C 25/426; B64C 25/46; F16D 2066/003; F16D 2066/005

USPC .......................................................... 701/70
See application file for complete search history.

(56) References Cited

U.S. PATENT DOCUMENTS

| | | | | |
|---|---|---|---|---|
| 5,505,531 | A * | 4/1996 | Griffith | B60T 13/662 303/20 |
| 6,016,892 | A * | 1/2000 | Berwanger | F16D 65/18 188/73.1 |
| 10,493,963 | B2 * | 12/2019 | Arsenault | B60T 13/662 |
| 2007/0187192 | A1 * | 8/2007 | Anderson | F16D 65/18 188/158 |
| 2008/0154445 | A1 * | 6/2008 | Goodman | B64C 25/426 701/3 |

(Continued)

*Primary Examiner* — Shardul D Patel
(74) *Attorney, Agent, or Firm* — McDonnell Boehnen Hulbert & Berghoff LLP (57) ABSTRACT

The present disclosure provides a brake system including (a) a brake stack, (b) a force member moveable between a retracted position and an extended position in response to a brake command, wherein the force member contacts the brake stack in the extended position, and wherein the brake system includes a running clearance defined by a distance between the brake stack and the force member in the retracted position, (c) a sensor in communication with the brake stack to measure a force between the force member and the brake stack in response to the brake command, and (d) a brake control unit configured to determine a running clearance brake command defined as a percentage of a maximum braking force that causes the force member to contact the brake stack, wherein the running clearance brake command is determined based on the force measured by the sensor for a plurality of brake commands.

20 Claims, 8 Drawing Sheets

(56) References Cited

U.S. PATENT DOCUMENTS

2008/0169160 A1* 7/2008 Solignat .................. F16D 65/18
                                                          188/72.1
2008/0284358 A1* 11/2008 Ralea .................... B60T 8/1703
                                                          318/561
2017/0001610 A1* 1/2017 Singh .................... B60T 13/746

* cited by examiner

SYSTEMS AND METHOD FOR DETERMINING RUNNING CLEARANCE BRAKE COMMAND FOR A BRAKE SYSTEM

FIELD

The present disclosure relates to brake systems. More specifically, the present disclosure relates to an aircraft brake system that determines a running clearance brake command based on information from a sensor in communication with the brake stack of the brake system.

BACKGROUND

Aircraft brakes are used in a variety of situations. For example, aircraft brakes are used to slow the aircraft down during landing roll along a runway. Aircraft brakes may also be used during ground handling operations such as, for example, taxiing, steering, and parking. Aircraft brakes typically include a brake stack having a series of rotating members, which are referred to as rotors, that turn along with the wheels of the aircraft. The brake stack also includes a series of stationary members, which are referred to as stators, that are interleaved with the rotors and fix to the brake housing via a torque tube.

When the brake stack is compressed, friction forces are developed between the rotors and stators and a brake torque is generated. The brake torque causes the aircraft to decelerate and eventually come to a stop. It is to be appreciated that brake torque is only generated after the rotors and stators are compressed to the point they are in firm contact with one another, which is referred to as brake stack closure. Aircraft brakes require a running clearance between the brake piston and the stators to enable smooth movement of the wheels during taxiing and takeoff of the aircraft.

Hydraulically actuated aircraft brakes require a minimum amount of hydraulic fluid volume (pressure) in order to overcome brake piston running clearance spring forces and generate brake clamp force and brake torque. This brake pressure value is known as the "stack closure" or "zero running clearance point" pressure and can vary depending on the wear state of the brake and/or manufacturing variances. Electrically actuated brakes also require a minimum brake actuation travel towards the carbon surface before the actuator surface makes contact with the brake heat-stack to produce clamping force. The running clearance is provided by design to prevent brakes from inadvertently generating torque when brakes are not required.

The variability in brake system fluid volume, control valves, wear state of the brakes, and brake actuation forces create a wide tolerance on when the brakes' friction elements start to generate torque. This variability may result in "grabby" brake operation leading to deceleration overshoots or slow onset application if the pilot attempts to slowly apply the brakes to prevent overshoots. Therefore, improved systems and methods for a running clearance brake command may be desired.

SUMMARY

In one aspect, the present disclosure provides a brake system. The brake system includes (a) a brake stack, (b) a force member moveable between a retracted position and an extended position in response to a brake command, wherein the force member contacts the brake stack in the extended position, and wherein the brake system includes a running clearance defined by a distance between the brake stack and the force member in the retracted position, (c) a sensor in communication with the brake stack to measure a force between the force member and the brake stack in response to the brake command, and (d) a brake control unit configured to determine a running clearance brake command defined as a percentage of a maximum braking force that causes the force member to contact the brake stack, wherein the running clearance brake command is determined based on the force measured by the sensor for a plurality of brake commands.

In another aspect, the present disclosure provides an aircraft. The aircraft comprises (a) a plurality of wheels, and a brake system on each of the plurality of wheels, wherein each break system comprises (i) a brake stack, (ii) a force member including a running clearance defined by a distance between the brake stack and the force member when the force member is in a retracted position, (iii) a sensor in communication with the brake stack to measure a force between the force member and the brake stack in response to a brake command; and (iv) a brake control unit configured to determine a running clearance brake command defined as a percentage of a maximum braking force that causes the force member to contact the brake stack, wherein the running clearance brake command is determined based on the force measured by the sensor for a plurality of brake commands.

In yet another aspect, a method for determining a running clearance brake command for a brake system including a brake stack and a force member is described. The method includes (a) generating, by a brake control unit, a plurality of brake commands corresponding to a plurality of percentages of a maximum braking force, wherein each of the plurality of brake commands activates the force member between a retracted position and an extended position at varying percentages of the plurality of percentages of the maximum braking force, (b) detecting, by a sensor in communication with the brake stack, a force between the force member and the brake stack in response to the plurality of brake commands, (c) storing, in a memory of the brake control unit, a plurality of percentages of the maximum braking force at which the force between the force member and the brake stack is detected by the sensor, and (d) determining, based on the stored plurality of percentages of the maximum braking force at which the force between the force member and the brake stack is detected by the sensor, the running clearance brake command for the brake system.

The features, functions, and advantages that have been discussed can be achieved independently in various examples or may be combined in yet other examples further details of which can be seen with reference to the following description and figures.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative examples of the present disclosure when read in conjunction with the accompanying figures.

DETAILED DESCRIPTION

Disclosed examples will now be described more fully hereinafter with reference to the accompanying figures, in which some, but not all of the disclosed examples are shown. Indeed, several different examples may be provided and should not be construed as limited to the examples set forth herein. Rather, these examples are provided so that this disclosure will be thorough and complete and will fully convey the scope of the disclosure to those skilled in the art.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Figure 7:
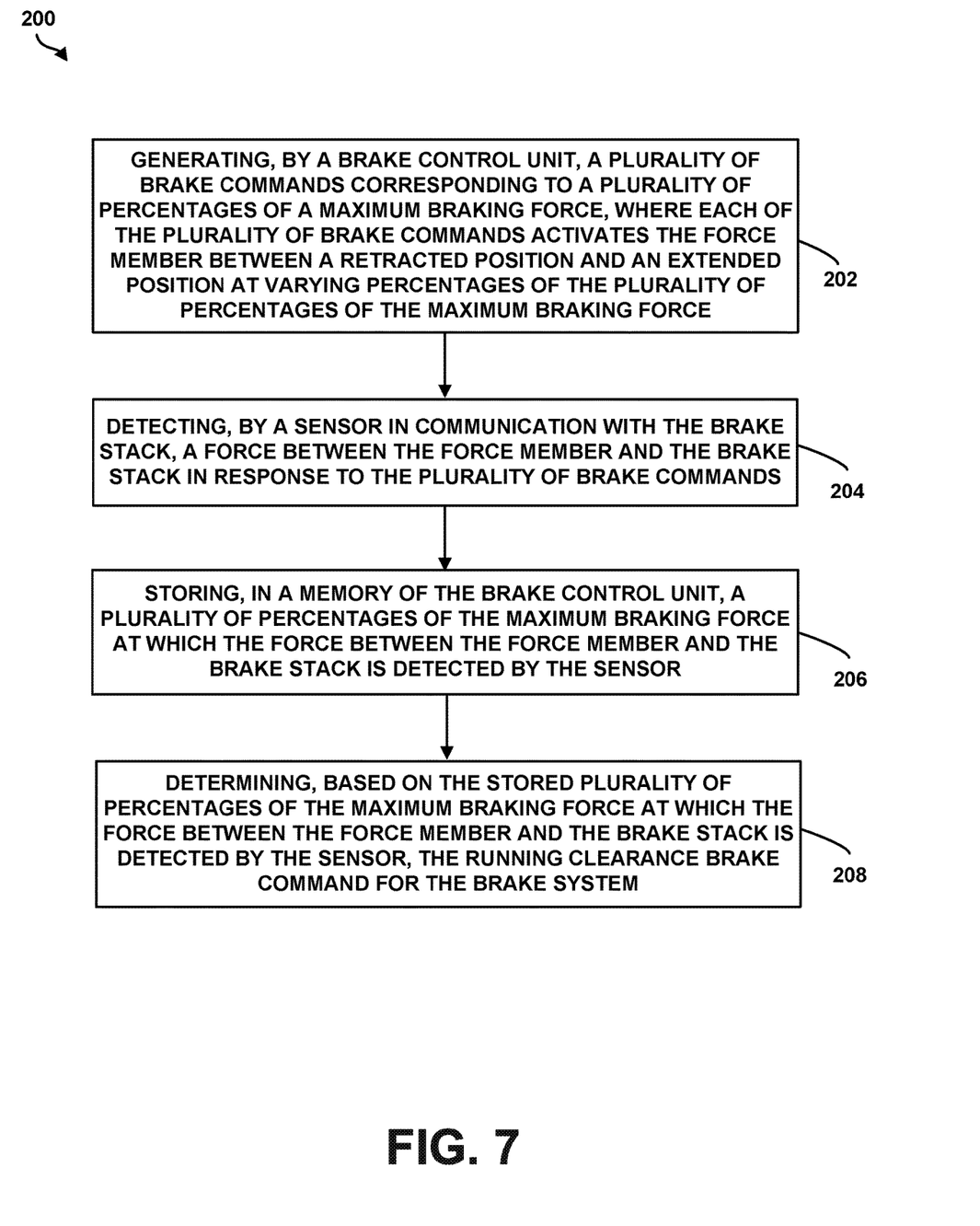
FIG. 7 is a flowchart of an example method, according to an example implementation.
Figure 8:
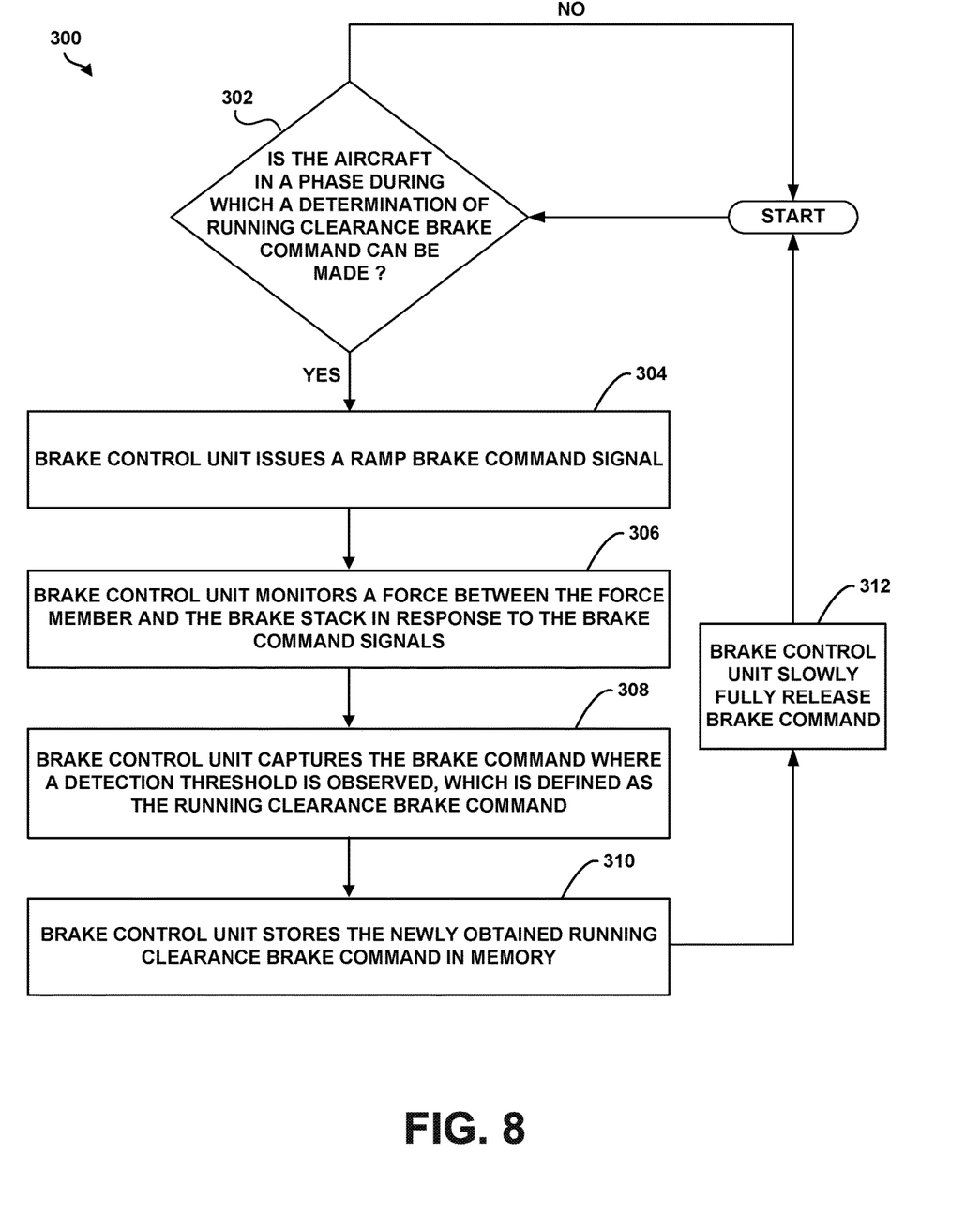
FIG. 8 is a flowchart of another example method, according to an example implementation.

In FIGS. 7 and 8, the blocks represent operations and/or portions thereof and lines connecting the various blocks do not imply any particular order or dependency of the operations or portions thereof. It will be understood that not all dependencies among the various disclosed operations are necessarily represented. FIGS. 7 and 8 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Unless otherwise specifically noted, elements depicted in the drawings are not necessarily drawn to scale.

Illustrative, non-exhaustive examples, which may or may not be claimed, of the subject matter according the present disclosure are provided below.

The present disclosure provides a brake system and methods of use for determining a running clearance brake command. In particular, the present disclosure provides a closed loop monitor system that detects the moment when the brakes begin applying a force to the structure of the airplane and using this knowledge on a historical basis to smoothly apply the brakes in a prompt manner. Such a method of contact detection can be more accurate than monitoring the pressure in the system because the generation of a force is a direct response of the brake applying a friction force to the brake stack. In contrast, measuring pressure response of the system requires measuring changes in pressure over time and making assumptions based on those changes. Utilizing a direct measuring of force from a sensor in the brake assembly provides direct feedback to the system that a friction force has developed in the brake assembly. Such prior knowledge of the brake heat-stack contact point (in terms of commanded pressure or actuator travel) can provide improved brake control on-set and reduce inherent lag associated with initial brake application. Further, the use of measured force at the tire to ground interface or internal to the brake assembly can provide accurate estimation of targeted brake commands at which the brake is at zero running clearance point right prior to generating torque.

The present disclosure provides a brake control function in the brake system control unit which enables detecting individual brake running clearance contact point (which applies for both hydraulically and electrically actuated brakes). Further, the present disclosure provides a method for measuring brake running clearance contact point on individual brakes.

These and other improvements are described in more detail below. Implementations described below are for purposes of example. The implementations described below, as well as other implementations, may provide other improvements as well.

Figure 1:
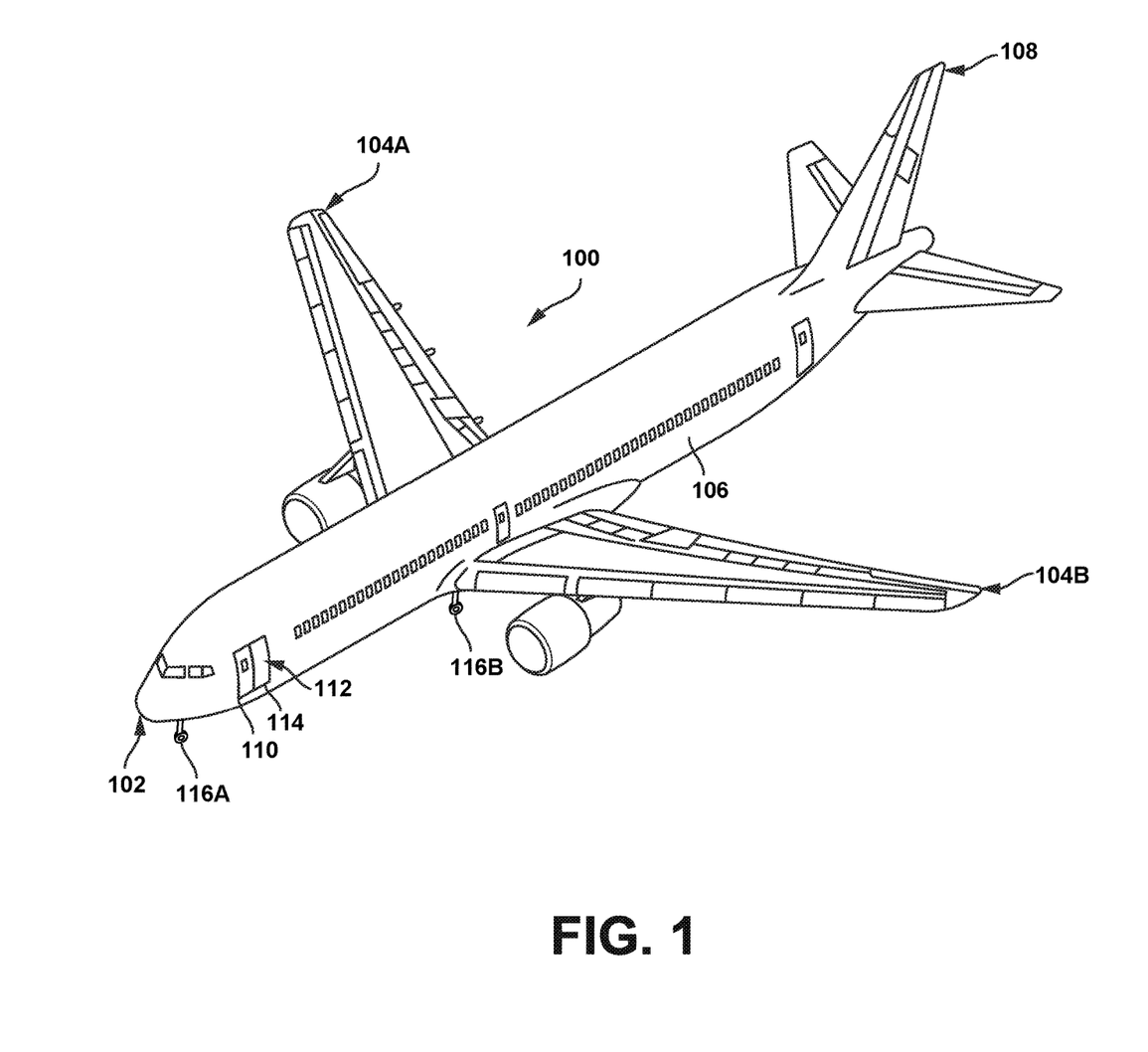
FIG. 1 is a perspective view of an aircraft, according to an example implementation.

With reference to the Figures, FIG. 1 is a perspective view of an aircraft 100, according to an example implementation.

The aircraft 100 includes a nose 102, wings 104A, 104B, a fuselage 106, and a tail 108, according to an example implementation. The aircraft 100 includes many areas arranged for storage of items during flight. In one example, the fuselage 106 includes storage underneath a passenger compartment for storing luggage and other items or supplies. In another example, the passenger compartment in the fuselage 106 includes overhead bins and under seat areas for storing further items. As further illustrated in FIG. 1, the aircraft 100 includes an aircraft door 110 that provides entry and/or exit to and from the cabin area 112 of the aircraft 100. As shown in FIG. 1, the fuselage 106 includes a fuselage cutout 114, and the aircraft door 110 is configured to translate from a closed position in which the aircraft door 110 covers the fuselage cutout 114 in the fuselage 106 to an open position (shown in FIG. 1). The aircraft 100 further includes wheels 116A, 116B which can be retracted and stored within the fuselage 106 during flight, and extended for use during takeoff, landing, and taxiing of the aircraft 100. The aircraft 100 can include additional wheels in addition to wheels 116A, 116B shown in FIG. 1.

Figure 2:
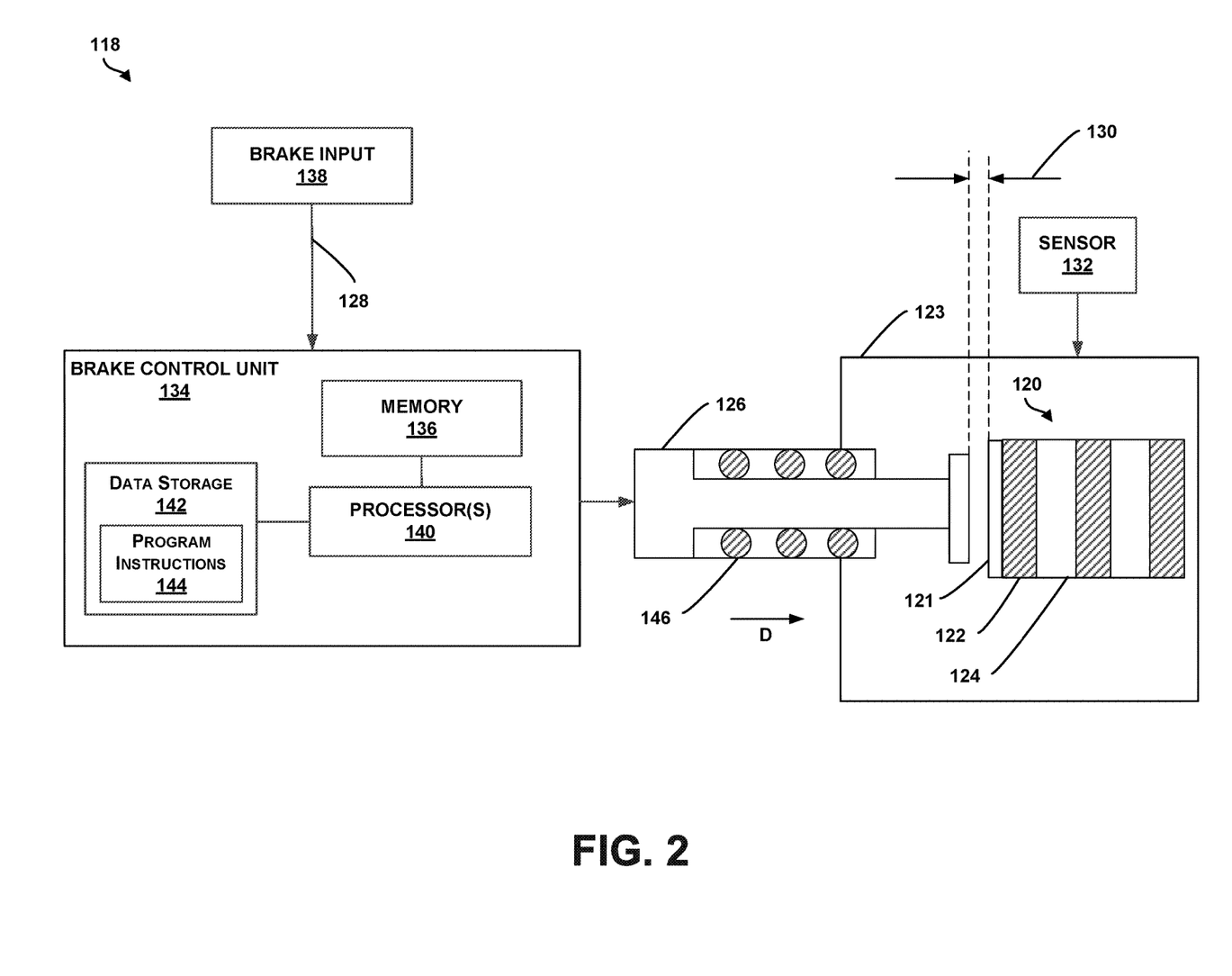
FIG. 2 is a schematic diagram of a brake system, according to an example implementation.

FIG. 2 illustrates a schematic diagram of a brake system 118, according to an example. One or more of the wheels 116A, 116B of the aircraft include the brake system 118. As shown in FIG. 2, the brake system 118 includes a brake stack 120. In one example, the brake stack 120 includes one or more rotors 122 interleaved with one or more stators 124. A brake stack closure represents a state of the brake stack 120 where the rotors 122 and stators 124 bear frictionally upon one another, and any further compression of the brake stack 120 creates a brake torque that resists movement of the aircraft 100.

As further shown in FIG. 2, the brake system 118 also includes a force member 126 that is moveable between a retracted position and an extended position in response to a brake command 128. The force member 126 is shown in the retracted position in FIG. 2. The force member 126 contacts the brake stack 120 in the extended position, to thereby compress the brake stack 120 and creates a brake torque that resists movement of the aircraft 100. In one example, as shown in FIG. 2, the brake stack 120 includes a pressure plate 121 such that the force member 126 contacts the one or more rotors 122 indirectly via the pressure plate 121. The brake system 118 includes a running clearance 130 defined by a distance between the brake stack 120 and the force member 126 in the retracted position. The brake stack 120 (including the one or more rotors 122 interleaved with the one or more stators 124) and the pressure plate 121 together comprise a brake assembly 123, as shown in FIG. 2.

The brake system 118 also includes a sensor 132 in the brake assembly 123. The sensor 132 is in communication with the brake stack 120 to measure a force between the force member 126 and the brake stack 120 in response to the brake command 128. The brake system 118 includes a brake control unit 134 configured to determine a running clearance brake command. The running clearance brake command is defined as a percentage of a maximum braking force that causes the force member 126 to initially contact the brake stack 120. The running clearance brake command is determined based on the force measured by the sensor 132 for a plurality of brake commands over a period of time.

In one example, as discussed above, the brake system 118 is utilized in an aircraft 100. However, it is to be appreciated that the brake system 118 described herein is not limited to an aircraft. It is also to be appreciated that while FIG. 2 illustrates only a single brake system 118, the aircraft 100 may actually include multiple brake systems 118. In one particular example, the aircraft 100 includes separate brake systems that correspond to the left and right wheels of the aircraft 100. Thus, individual running clearance brake commands are determined for each individual brake system 118 corresponding to each individual wheel.

Further, the disclosed brake system 118 may be used in any brake system including a running clearance. As described above, the running clearance represents the displacement a brake piston (i.e., the force member 126) undergoes as a user initially exerts force upon a brake input (i.e., a brake pedal), but the force is not yet transmitted to the brake stack 120. Therefore, the brake system 118 described herein is not limited to any particular type of brake. For example, the brake system 118 described herein may be utilized with hydraulic brake systems, pneumatic brake systems, or electric brake systems, as non-limiting examples.

In one example, the brake control unit 134 is in electronic communication with a brake input 138. In one such example, the brake input 138 comprises a brake pedal. An operator depresses the brake pedal manually to create the brake command 128 received by the brake control unit 134. The brake command 128 represents an amount of braking requested to the brake system 118. Thus, if a manual brake pedal is employed, then an operator indicates the amount of braking requested to the brake system 118 using the brake pedal. Alternatively, instead of manual control, the brake command 128 is generated by an autobrake algorithm, where autobrake instructions are saved in a memory 136 of the brake control unit 134.

In one example, the force measured by the sensor 132 comprises a clamping force applied to the brake stack 120 by the force member 126. In such an example, the sensor 132 may comprise a load cell. In another example, the force measured by the sensor 132 comprises a force applied to the brake stack 120 by the force member 126 that generates a brake torque. In such an example, the sensor 132 comprises a torque sensor. In one example, the sensor 132 measures a force internal to the brake hardware (e.g., a torque or a load measured by a sensor 132 positioned within the hardware of brake system 118 itself). In another example, the sensor 132 measures a force applied to the brake stack 120 indirectly (e.g., through the tire-to-ground reaction). In such an example, the sensor 132 may comprise a strain gauge or load cell on torque-take-out structural elements on the landing gear of the aircraft 100.

As shown in FIG. 2, the brake control unit 134 further includes one or more processors 140, and data storage 142 having stored thereon program instructions 144, that when executed by the one or more processors 140, cause the brake system 118 to generate the plurality of brake commands, as well as other commands to facilitate the various functions described herein. Although various components of the brake control unit 134 are shown as distributed components, it should be understood that any of such components may be physically integrated and/or distributed according to the desired configuration of the brake system 118.

Depending on the desired configuration, one or more processors 140 can be any type of processor including, but not limited to, a microprocessor, a microcontroller, a digital signal processor, programmable logic device, or any combination thereof. As discussed above, the brake system 118 includes additional on-board data storage, such as memory 136 coupled to the one or more processors 140. The memory 136 may store software that can be accessed and executed by the one or more processors 140, for example. The memory 136 can include any type of memory now known or later developed including but not limited to volatile memory (such as RAM), non-volatile memory (such as ROM, flash memory, etc.) or any combination thereof. In one example, the data storage 142 and memory 136 comprise a single component of the brake control unit 134. In another example, the data storage 142 and memory 136 comprise separate components of the brake control unit 134.

In operation, the one or more processors 140 may execute additional instructions to carry out various functions of the brake system 118. In one example, the one or more processors 140 execute instructions to (i) monitor the force measured by the sensor 132 for each of the plurality of brake commands to determine the running clearance brake command of the brake system 118, and (ii) determine a brake force corresponding to the running clearance brake command. In another example, the one or more processors 140 execute instructions to save the running clearance brake command in the memory 136, wherein the memory 136 includes a plurality of previously recorded running clearance brake commands. In such an example, the one or more processors 140 may further execute instructions to determine the running clearance brake command of the brake system 118 as an average of a most recent running clearance brake command and the plurality of previously recorded running clearance brake commands.

In another example, the one or more processors 140 execute instructions such that generating the plurality of brake commands comprises (i) activating the force member 126 between the retracted position and the extended position at a plurality of percentages of the maximum braking force, and (ii) storing, in the memory 136, the percentage of the maximum braking force at which a force between the force member 126 and the brake stack 120 is detected by the sensor 132. In yet another example, autobrake instructions are saved in the memory 136, and the one or more processors 140 execute instructions to generate, by the autobrake instructions, an input command. In such an example, the input command represents an amount of braking requested by the brake system 118, and the input command is determined based on the running clearance brake command.

Figure 3:
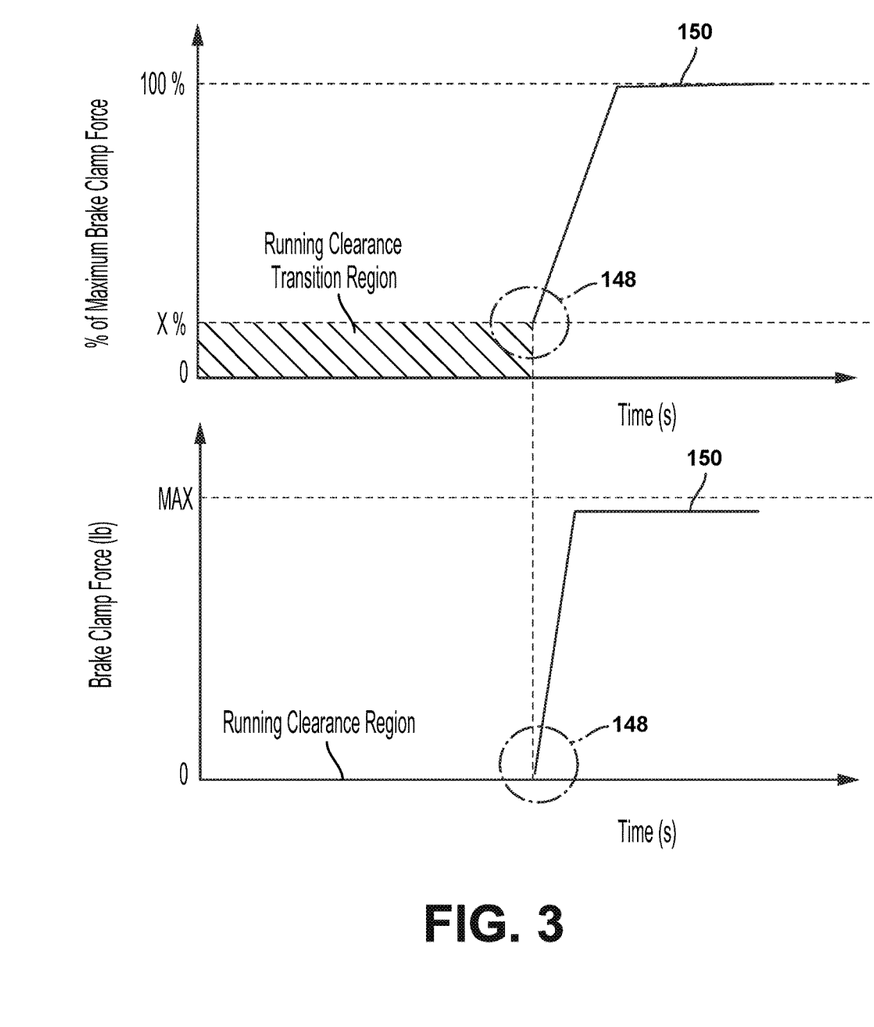
FIG. 3 is a graph illustrating the determination of a running clearance point, both as a percentage of a maximum braking force and as a measurement of brake clamp force with respect to time, according to an example implementation.

In use, when the brake system 118 receives a brake command 128, the force member 126 overcomes a biasing force exerted by a biasing member 146 to translate the force member 126 in a direction D towards the brake stack 120. As the force member 126 translates in the direction D an end portion of the force member 126 eventually abuts against and exerts a compressive force upon the brake stack 120. This position, when the force member 126 first contacts the brake stack 120 and begins to apply a force to the brake stack 120, may be referred to as the zero running clearance point 148 (FIG. 3). FIG. 3 is a graph illustrating the determination of the running clearance point 148, both as a percentage of a maximum braking force and as a measurement of brake clamp force with respect to time. As shown in FIG. 3, the force member 126 continues to compress the brake stack 120 until the brake system 118 reaches a maximum braking force 150. Thus, when the brake system 118 is at the maximum braking force 150, the brake stack 120 is fully compressed.

Figure 4:
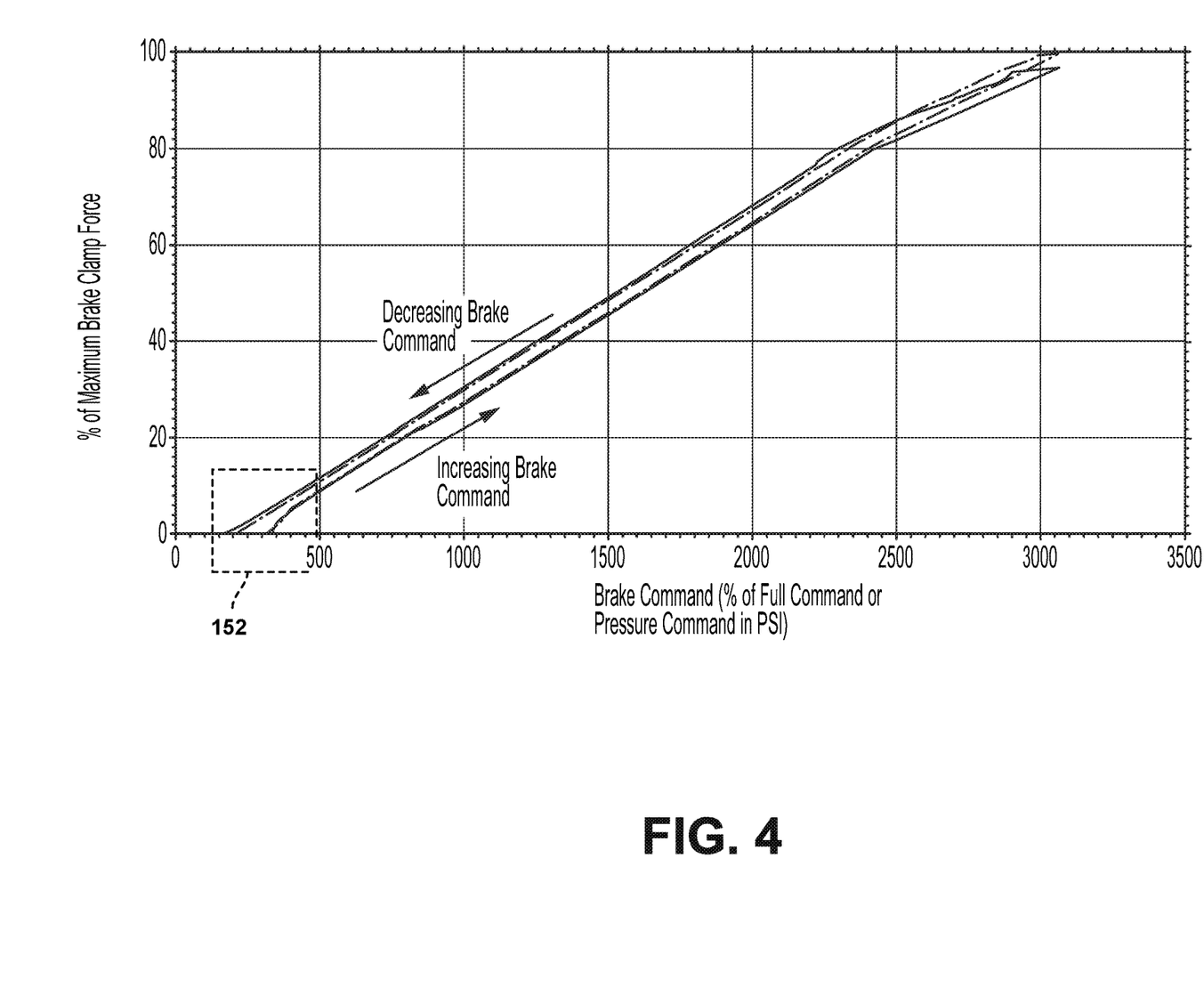
FIG. 4 is a graph illustrating the measured brake clamping force for a plurality of brake commands, according to an example implementation.

As discussed above, the brake control unit 134 is configured to determine a running clearance brake command, which is defined as a percentage of a maximum braking force that causes the force member 126 to contact the brake stack 120. FIG. 4 is a graph illustrating the measured brake clamping force for a plurality of brake commands, according to an example. As shown in FIG. 4, the brake control unit 134 will slowly sweep (e.g., increase and decrease) a brake clamp force command on each wheel brake and monitor the brake force through direct force/load feedback from the sensor 132. This scheme will be done for a number of cycles to obtain an average value of at which brake command input generates a measurable initial brake stack clamp force at the contact point between the force member 126 and the brake stack 120, as highlighted in the targeted brake zero-torque-point region 152, as shown in FIG. 4. Due to the inherent structural hysteresis of the brake, the contact point between the force member 126 and the brake stack 120 varies depending on the direction which brake command is being applied. The brake control unit 134 continuously searches for the average contact point by continuously applying and releasing the brakes while mapping in memory 136 the brake command at which initial force has been observed by the force sensor. This brake command is then stored in the memory 136 as the running clearance brake command. This monitoring function can also provide valve health, brake pad health, and other monitoring benefits to ensure each element on each brake system 118 is operational prior the need for brake system 118 on ground.

Figure 5:
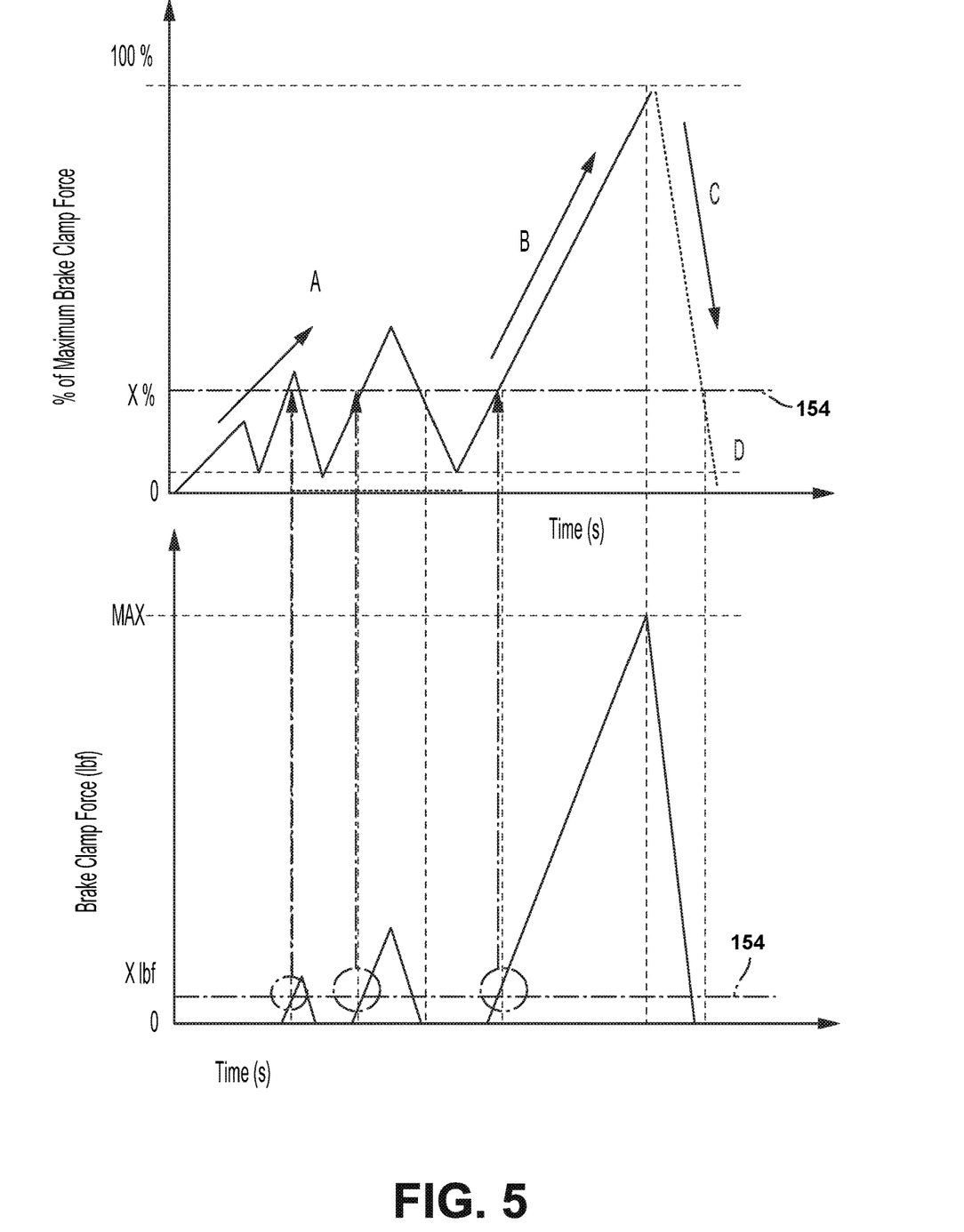
FIG. 5 is a graph illustrating the determination of the running clearance brake command for a plurality of brake commands, both as a percentage of a maximum braking force and as a measurement of brake clamp force with respect to time, according to an example implementation.

FIG. 5 is a graph illustrating the determination of the running clearance brake command for a plurality of brake commands, both as a percentage of a maximum braking force and as a measurement of brake clamp force with respect to time. Such measurements are made when the aircraft 100 is in air, the landing gear is extended, the wheels 116A, 116B are not rotating, and the aircraft 100 is on final approach, as examples.

As shown in FIG. 5, in portion A of the graph, the brake command is slowly swept and a force is measured by the sensor 132 located in each brake assembly 123. This cycle is repeated at different final command magnitudes as show in FIG. 5. This command cycle is repeated several times at different brake command magnitudes. As shown in portion B of the graph in FIG. 5, once an average running clearance brake command is determined by averaging each individual mapped brake command and observed force feedback instances, the brake command is increased for a final cycle to maximum value and the force magnitude reading is stored in memory 136. As shown in portion C of the graph in FIG. 5, the brake command is slowly decreased to zero and the brake control unit 134 observes the instance the force between the force member 126 and the brake stack 120 returns to zero and stores this value in memory 136. Finally, as shown in portion D of the graph in FIG. 5, previously stored running clearance brake commands are averaged with the last command value in step C and a final running clearance brake command magnitude 154 is computed and stored in the memory 136 of the brake control unit 134 for use the next time the brake system 118 is used.

Due to certain system architecture and component limitations in aircrafts, brake running clearance determination may only be accomplished while the wheels are rotating. The rotating wheel's reaction torque due to applied brake torque is the measurable parameter which a contact detection function can utilize for obtaining the average running clearance brake command similar to the previous method explained.

As such, a limiting factor with brake reaction torque is that it may only be observable when the wheels are in motion. In addition, brakes need to be commanded to observe brake reaction torque. This limits the phases of the flight which exists for a "clean" measurement of brake torque to determine the average running clearance command. As used herein, clean is to exclude unpredictable variations due to external conditions, like antiskid that can vary over different runway conditions. A candidate flight phase for such a determination is during landing gear retraction where the brakes are applied automatically by the brake system to arrest the rotating wheels before entering the wheel well. In such a use case, the torque feedback occurs from a sensor either mounted internally to the brake or externally mounted on the landing gear structure. Another flight phase at which an opportunity exists for clean measurement of the brake torque and collection of data while wheels are in motion is during slow brake pedal or autobrake applications.

Figure 6:
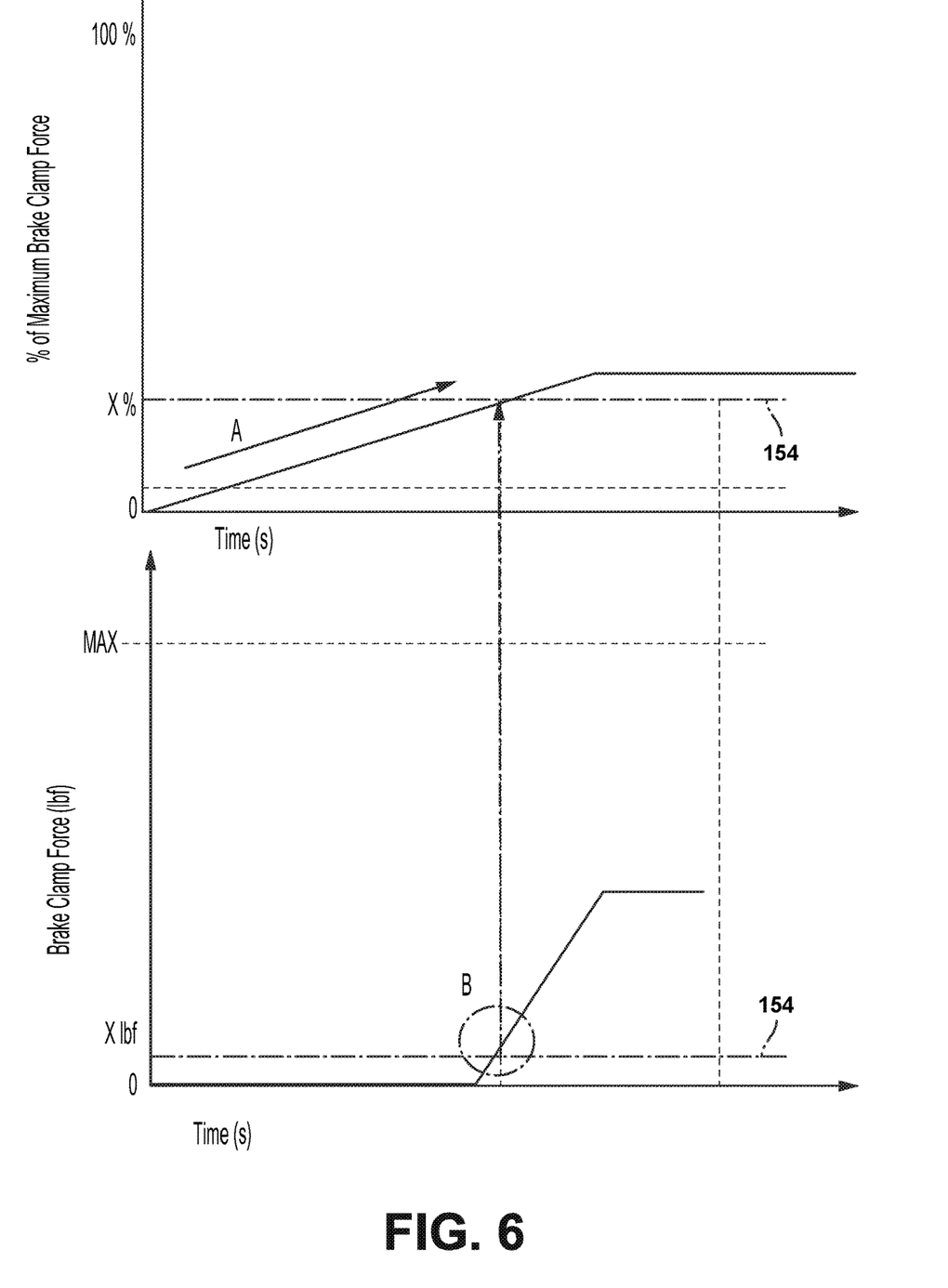
FIG. 6 is a graph illustrating the determination of the running clearance brake command for a plurality of brake commands, both as a percentage of a maximum braking force and as a measurement of brake clamp force with respect to time, according to an example implementation.

FIG. 6 is a graph illustrating the determination of the running clearance brake command for a plurality of brake commands, both as a percentage of a maximum braking force and as a measurement of brake clamp force with respect to time. Such measurements may be made when the aircraft 100 is in air and the wheels are rotating, or when the aircraft 100 is on the ground and the wheels are rotating.

As shown in FIG. 6, in portion A of the graph, the brake command is ramped up slowly and the brake torque is measured by a sensor located in each brake or torque rod. As shown in portion B of the graph in FIG. 6, once brake torque is detected, the force magnitude reading and command associated with that force is stored in memory 136 as the running clearance brake command. Previously stored running clearance brake commands are averaged with the most recent running clearance brake command, and a final running clearance brake command is computed and stored in the memory 136 of the brake control unit 134 for use the next time the brake system 118 is used.

FIG. 7 is a block diagram of an example of a method 200 for determining a running clearance brake command for a brake system 118. Method 200 shown in FIG. 7 presents an example of a method that could be used with any of the examples of the brake system 118 discussed above in relation to FIGS. 1-6, as examples. Method 200 includes one or more operations, functions, or actions as illustrated by one or more of blocks 202-208. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Initially, at block 202, the method 200 includes generating, by a brake control unit 134, a plurality of brake commands corresponding to a plurality of percentages of a maximum braking force, where each of the plurality of brake commands activates the force member 126 between a retracted position and an extended position at varying percentages of the plurality of percentages of the maximum braking force. At block 204, the method 200 includes detecting, by a sensor 132 in communication with the brake stack 120, a force between the force member 126 and the brake stack 120 in response to the plurality of brake commands. At block 206, the method 200 includes storing, in a memory 136 of the brake control unit 134, a plurality of percentages of the maximum braking force at which the force between the force member 126 and the brake stack 120 is detected by the sensor 132. At block 208, the method 200 includes determining, based on the stored plurality of percentages of the maximum braking force at which the force between the force member 126 and the brake stack 120 is detected by the sensor 132, the running clearance brake command for the brake system.

In one example, the method 200 further includes (a) saving the running clearance brake command in a memory 136, wherein the memory includes a plurality of previously recorded running clearance brake commands, and (b) determining the running clearance brake command of the brake system is an average of a most recent running clearance brake command and the plurality of previously recorded running clearance brake commands.

In another example, the method 200 further includes generating, by autobrake instructions, an input command, wherein the input command represents an amount of braking requested by the brake system 118, and wherein the input command is determined based on the running clearance brake command.

FIG. 8 is another block diagram of another example of a method 300 for determining a running clearance brake command for a brake system 118. Method 300 shown in FIG. 8 presents an example of a method that could be used with any of the examples of the brake system 118 discussed above in relation to FIGS. 1-7, as examples. Method 300 includes one or more operations, functions, or actions as illustrated by one or more of blocks 302-312. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 302, the method 300 includes making a determination whether the aircraft 100 is in a phase during which a determination of running clearance brake command can be made. In one example, such a phase is when the aircraft 100 is in air, the landing gear is extended, the wheels 116A, 116B are not rotating, and the aircraft 100 is on final approach. In another example, such a phase is when the aircraft 100 is in air and the wheels are rotating, or when the aircraft 100 is on the ground and the wheels are rotating.

At block 304, the method 300 includes the brake control unit 134 issuing a ramp brake command signal, as illustrated in FIGS. 3-7. At block 306, the method 300 includes the brake control unit monitoring the force between the force member 126 and the brake stack 120 in response to the brake command signals. At block 308, the method 300 includes the brake control unit 134 capturing the brake command where a detection threshold is observed. The detection threshold may be a percentage of a maximum braking force, such as 1% of maximum braking force, 2% of maximum braking force, or 3% of maximum braking force as non-limiting examples. This brake command may be defined as the running clearance brake command. At block 310, the method 300 includes the brake control unit 134 stores this newly obtained running clearance brake command in memory 136. At block 312, the method 300 includes the brake control unit 134 slowly fully releasing the brake command.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may provide different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A brake system comprising:
   a brake stack;
   a force member moveable between a retracted position and an extended position in response to a brake command, wherein the force member contacts the brake stack in the extended position, and wherein the brake system includes a running clearance defined by a distance between the brake stack and the force member in the retracted position;
   a sensor in communication with the brake stack to measure a force between the force member and the brake stack in response to the brake command; and
   a brake control unit configured to determine a running clearance brake command defined as a percentage of a maximum braking force that causes the force member to contact the brake stack, wherein the brake control unit determines the running clearance brake command by:
      executing a plurality of brake command inputs to activate the force member between the retracted position and the extended position at a plurality of percentages of the maximum braking force; and
      monitor the force measured by the sensor for each of the plurality of brake command inputs; and
      determine the running clearance brake command of the brake system as an average value at which one of the plurality of brake command inputs generates a measurable initial brake stack clamp force, based on the force measured by the sensor, at a contact point between the force member and the brake stack.

2. The brake system of claim 1, wherein the brake control unit comprises:
   one or more processors; and
   data storage having stored thereon program instructions, that when executed by the one or more processors, cause the brake system to generate the plurality of brake command inputs.

3. The brake system of claim 2, wherein the one or more processors execute instructions to:
   save the running clearance brake command in a memory, wherein the memory includes a plurality of previously recorded running clearance brake commands.

4. The brake system of claim 2, wherein generating the plurality of brake commands comprises:
   storing, in a memory, the percentage of the maximum braking force at which a force between the force member and the brake stack is detected by the sensor.

5. The brake system of claim 2, wherein autobrake instructions are saved in a memory, and wherein the one or more processors execute instructions to:
   generate, by the autobrake instructions, an input command, wherein the input command represents an amount of braking requested by the brake system, and wherein the input command is determined based on the running clearance brake command.

6. The brake system of claim 1, wherein the brake stack comprises one or more rotors interleaved with one or more stators.

7. The brake system of claim 1, wherein the force measured by the sensor comprises a clamping force applied to the brake stack by the force member.

8. The brake system of claim 1, wherein the force measured by the sensor comprises a force applied to the brake stack by the force member that generates a brake torque.

9. The brake system of claim 1, wherein the sensor comprises a load cell.

10. The brake system of claim 1, wherein the sensor comprises a torque sensor.

11. An aircraft comprising:
    a plurality of wheels; and
    a brake system on each of the plurality of wheels, wherein each break system comprises:
       a brake stack;
       a force member moveable between a retracted position and an extended position in response to a brake command, wherein the force member contacts the brake stack in the extended position, and the brake system including a running clearance defined by a distance between the brake stack and the force member when the force member is in a retracted position;
       a sensor in communication with the brake stack to measure a force between the force member and the brake stack in response to a brake command; and
       a brake control unit configured to determine a running clearance brake command defined as a percentage of a maximum braking force that causes the force member to contact the brake stack, wherein the brake control unit determines the running clearance brake command by:
          executing a plurality of brake command inputs to activate the force member between the retracted position and the extended position at a plurality of percentages of the maximum braking force; and
          monitor the force measured by the sensor for each of the plurality of brake command inputs; and
          determine the running clearance brake command of the brake system as an average value at which one of the plurality of brake command inputs generates a measurable initial brake stack clamp force, based on the force measured by the sensor, at a contact point between the force member and the brake stack.

12. The aircraft of claim 11, wherein the brake control unit comprises:
    one or more processors; and
    data storage having stored thereon program instructions, that when executed by the one or more processors, cause the brake system to generate the plurality of brake command inputs.

13. The aircraft of claim 12, wherein generating the plurality of brake commands comprises:
    storing, in a memory, the percentage of the maximum braking force at which a force between the force member and the brake stack is detected by the sensor.

14. The aircraft of claim 12, wherein autobrake instructions are saved in a memory, and wherein the one or more processors execute instructions to:
    generate, by the autobrake instructions, an input command, wherein the input command represents an amount of braking requested by the brake system, and wherein the input command is determined based on the running clearance brake command.

15. The aircraft of claim 11, wherein the brake control unit determines the running clearance brake command when the aircraft is in air and landing gear is extended.

16. The aircraft of claim 11, wherein the brake control unit determines the running clearance brake command when the aircraft is on ground.

17. The aircraft of claim 11, wherein the brake control unit determines the running clearance brake command when the aircraft is on final approach.

18. The aircraft of claim 11, wherein the brake control unit determines the running clearance brake command during landing gear retraction where the force member is caused to be in the extended position to arrest rotation of the plurality of wheels before the plurality of wheels enter a wheel well of the aircraft.

19. A method for determining a running clearance brake command for a brake system including a brake stack and a force member, the method comprising:
   generating, by a brake control unit, a plurality of brake command inputs corresponding to a plurality of percentages of a maximum braking force, wherein each of the plurality of brake command inputs activates the force member between a retracted position and an extended position at varying percentages of the plurality of percentages of the maximum braking force;
   detecting, by a sensor in communication with the brake stack, a force between the force member and the brake stack in response to the plurality of brake command inputs;
   storing, in a memory of the brake control unit, a plurality of percentages of the maximum braking force at which the force between the force member and the brake stack is detected by the sensor and one of the plurality of brake command inputs generates a measurable initial brake stack clamp force at a contact point between the force member and the brake stack; and
   determining the running clearance brake command for the brake system as an average value of the stored plurality of percentages of the maximum braking force at which one of the plurality of brake command inputs generates a measurable initial brake stack clamp force, based on the force measured by the sensor, at a contact point between the force member and the brake stack.

20. The method of claim 19, further comprising:
   generating, by autobrake instructions, an input command, wherein the input command represents an amount of braking requested by the brake system, and wherein the input command is determined based on the running clearance brake command.

* * * * *